US008049474B2

(12) United States Patent
Bernacchia et al.

(10) Patent No.: US 8,049,474 B2
(45) Date of Patent: Nov. 1, 2011

(54) SWITCHING CONVERTER WITH PLURAL CONVERTER STAGES HAVING CALIBRATED CURRENT UPTAKE

(75) Inventors: Giuseppe Bernacchia, Noventa Padovana (IT); Riccardo Pittassi, Trieste (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/815,268

(22) Filed: Jun. 14, 2010

(65) Prior Publication Data

US 2010/0244803 A1     Sep. 30, 2010

Related U.S. Application Data

(63) Continuation of application No. 11/728,036, filed on Mar. 23, 2007, now Pat. No. 7,759,919.

(30) Foreign Application Priority Data

Mar. 23, 2006 (DE) .......................... 10 2006 013 524

(51) Int. Cl.
*G05F 1/613* (2006.01)

(52) U.S. Cl. ........................... 323/272; 323/288; 363/65

(58) Field of Classification Search .................. 323/272, 323/288, 271, 268, 225; 363/65
See application file for complete search history.

(56) References Cited

U.S. PATENT DOCUMENTS

| 5,477,132 | A | 12/1995 | Canter et al. |
| 6,674,325 | B2 | 1/2004 | Chen et al. |
| 6,839,252 | B2 * | 1/2005 | Tai et al. .................. 363/65 |
| 6,903,537 | B2 * | 6/2005 | Tzeng et al. .............. 323/268 |
| 2003/0102849 | A1 | 6/2003 | Schiff et al. |
| 2004/0000894 | A1 | 1/2004 | Zhang |
| 2004/0076027 | A1 | 4/2004 | Wu et al. |

FOREIGN PATENT DOCUMENTS

GB    2012501 A    7/1979

OTHER PUBLICATIONS

Tarter, Ralph E., Solid-State Power Conversion Handbook, 1993, pp. 484-495, John Wiley & Sons, Inc., New York.

* cited by examiner

*Primary Examiner* — Harry Behm
(74) *Attorney, Agent, or Firm* — Maginot, Moore & Beck

(57) ABSTRACT

A switching converter according includes a control arrangement to furnish a control signal dependent on the output voltage, as well as a first and at least one second converter stage. Each converter includes an inductive storage element, a ramp signal generator to furnish a signal having a ramp slope, a pulse width modulator which receives the control signal and the ramplike signal and which furnishes a pulse width modulated signal, and a driver circuit which receives the pulse width modulated signal and the input voltage and which applies the input voltage to the inductive storage element depending on the pulse width modulated signal. The ramp slope of the ramplike signal of the at least one second converter stage is adjustable. The ramp signal generator of the second converter stage receives a calibration signal which depends on the inductance of the inductive storage element of the first converter stage.

6 Claims, 11 Drawing Sheets

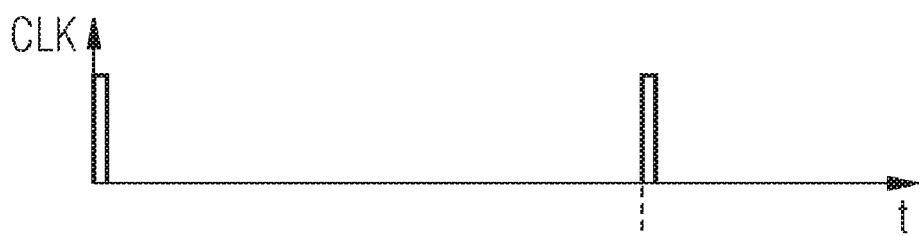
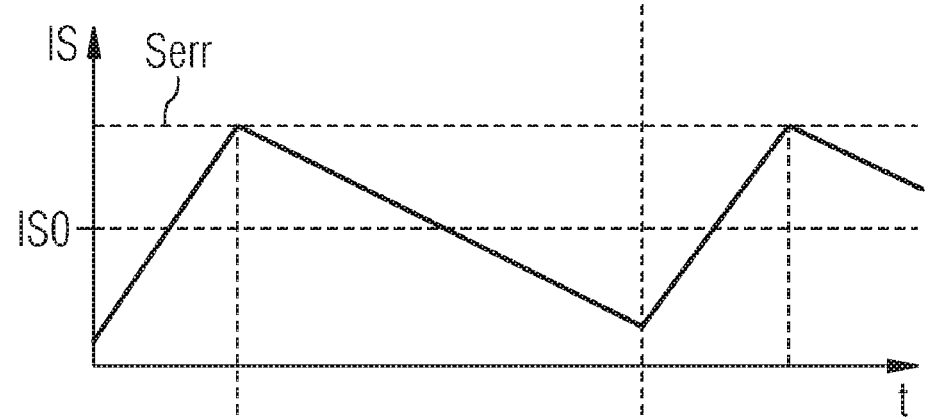
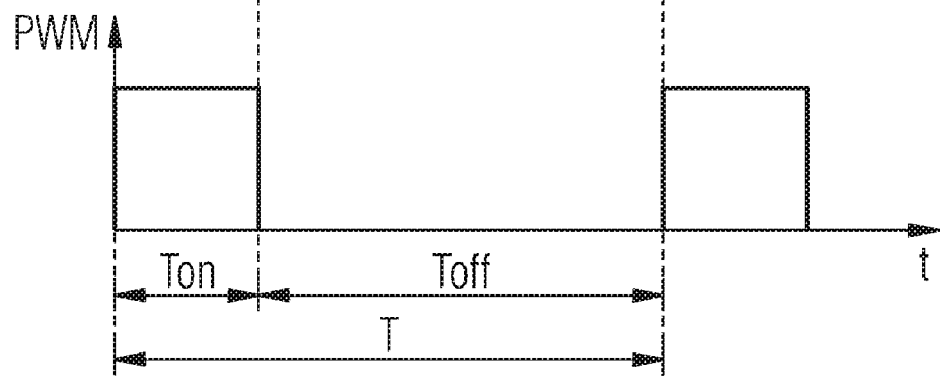

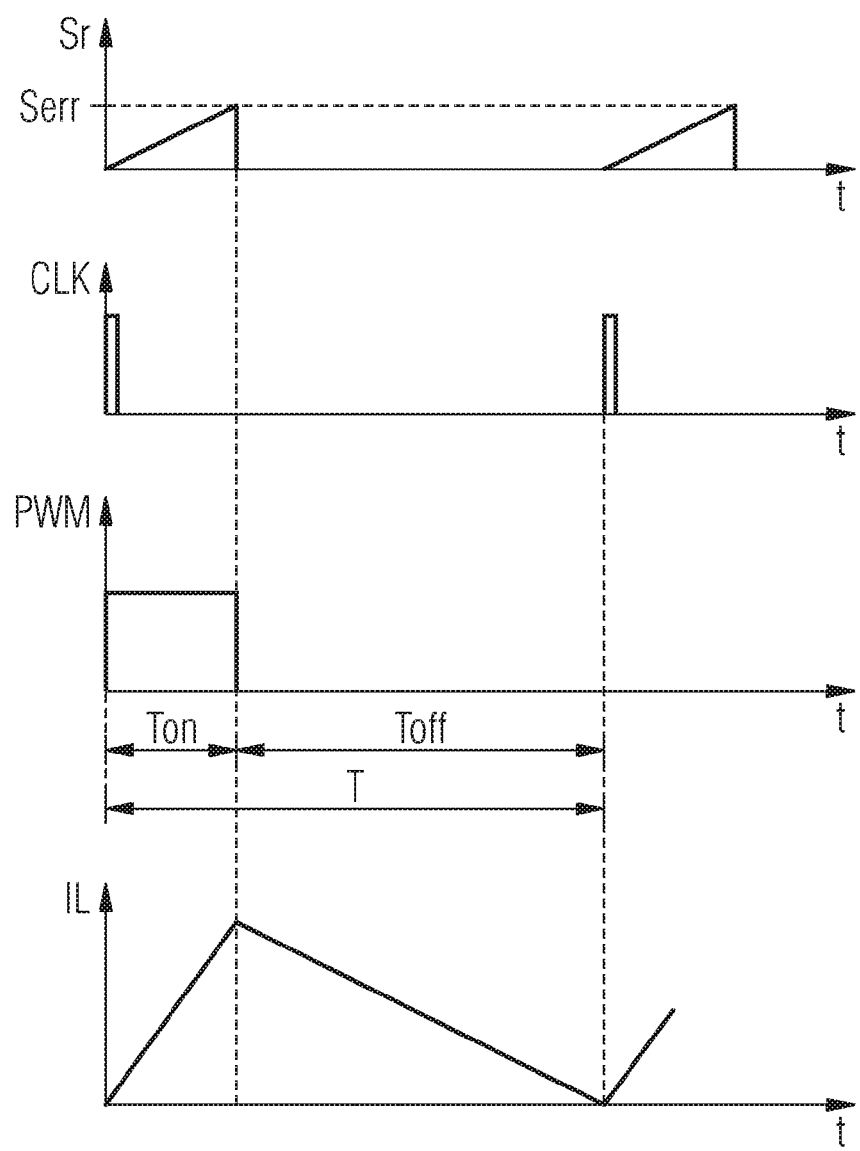

SWITCHING CONVERTER WITH PLURAL CONVERTER STAGES HAVING CALIBRATED CURRENT UPTAKE

This is a continuation application of, and claims the benefit of, U.S. patent application Ser. No. 11/728,036, filed Mar. 23, 2007.

TECHNICAL FIELD

The present invention relates to a switching converter with several converter stages.

TECHNICAL BACKGROUND

For supplying current and voltage to a load with a high current uptake, such as a CPU (Central Processing Unit) in a computer, it is known how to employ switching converters having several converter stages connected in parallel. Each of these converter stages receives an input voltage and each of these converter stages provides a portion of the overall current required to supply the load. Each individual converter stage has an inductive storage element, where the input voltage is applied in accordance with a pulse width modulated signal that is generated for each converter stage. Control of the current uptake of an individual converter stage occurs in terms of the duty cycle of the pulse width modulated signal generated for the particular converter stage.

Suitable as the converter stages are both those working by the current control principle (Current Mode, CM) and those working by the voltage control principle (Voltage, Mode, VM). CM converter stages and VM converter stages differ with respect to the generation of the pulse width modulated signal that controls the current uptake of the converter stages. Common to both of the two principles is that a control signal dependent on the output voltage is generated to produce the pulse width modulated signal.

In a CM converter stage, this control signal is compared to a ramp signal, which is proportional to a current flow through the inductive storage element of the converter stage. The steepness of the edges of this ramp signal will depend on the input voltage and the inductance of the inductive storage element of the converter stage. In a VM converter stage, a separate ramp signal generator is present to create the ramp signal.

One problem with the parallel connection of several converter stages that supply a load in common is that identical current uptakes for the converter stages—unless further steps are taken—can be achieved only if the individual converter stages are identical in construction and if the components used to realize the converter stages are identical in dimension. Differing parameters of the components result in unequal current loading of the individual converter stages. In extreme cases, this can lead to individual converter stages becoming overheated and thereby damaged.

In order to achieve uniform current distribution it is known to make one of the converter stages a master converter stage and to detect the output current of this converter stage. The other converter stages are slave converter stages whose output currents are compared to the output current of the master stage. A control signal, supplied to the individual converter stages across an external feedback control loop and dependent on the output voltage, is corrected in the slave converter stages depending on the comparison of the output current of the particular converter stage to the output current of the master converter stage so as to achieve identical current uptakes for the individual converter stages.

SUMMARY

A switching converter according to a first embodiment of the invention comprises a controller arrangement for providing a control signal dependent on the output voltage, as well as a first converter stage and at least one second converter stage. These converter stages are configured as current mode (CM) converter stages and each has an inductive storage element, a current measurement arrangement, designed to detect a current through the inductive storage element and to provide a current measuring signal being proportional to this current, a pulse width modulator which receives the control signal and the current measuring signal and which provides a pulse width modulated signal, and a driver circuit which receives the pulse width modulated signal and the input voltage and which applies the input voltage to the inductive storage element depending on the pulse width modulated signal. The at least one second converter stage is designed so that a proportionality factor can be adjusted between the current through the inductive storage element and the current measuring signal of the current measurement arrangement of the at least one second converter stage. To adjust this proportionality factor, the at least one second converter stage receives a calibration signal which is dependent on a proportionality factor between a current through the inductive storage element of the first switching converter and the current measuring signal of the first switching converter.

The current uptake and the current delivery of a CM converter stage is dependent on both the feedback control signal and the current measuring signal, in particular, the proportionality factor between the current flowing through the inductive storage element and the current measuring signal. This current measuring signal is used along with the control signal to produce the pulse width modulated signal actuating the driver stage. Making use of the calibration signal, the proportionality factor of the at least one second converter stage in the switching converter is adjusted in dependence on the proportionality factor of the first converter stage so that the current delivery of this at least one second converter stage corresponds to the current delivery of the first converter stage.

A switching converter according to a second embodiment of the invention comprises a control arrangement to furnish a control signal dependent on the output voltage, as well as a first and at least one second converter stage. The converter stages are designed as Voltage-Mode (VM) converter stages and each of them comprises an inductive storage element with an inductance, a ramp signal generator which is designed to furnish a ramplike signal having a ramp slope, a pulse width modulator which receives the control signal and the ramplike signal and which furnishes a pulse width modulated signal, and a driver circuit which receives the pulse width modulated signal and the input voltage and which applies the input voltage to the inductive storage element depending on the pulse width modulated signal. The ramp slope of the ramplike signal produced by the ramp signal generator of the at least one second converter stage is adjustable in this switching converter, and the ramp signal generator of this at least one second converter stage receives a calibration signal which depends on the inductance of the inductive storage element of the first converter stage.

The current uptake and the current delivery of a VM converter stage is dependent on both the feedback control signal and the inductance of the inductive storage element. By making use of the calibration signal which is dependent on the inductance of the storage element in the first converter stage, the steepness of the ramp signal generated in the at least second converter stage is adjusted in the switching converter of the invention so that the current uptake or current delivery of this at least second converter stage corresponds to the current uptake or current delivery of the first converter stage.

BRIEF DESCRIPTION OF THE DRAWINGS

Embodiments of the invention will now be explained in greater detail with reference to the drawings.

FIG. 4 shows sample time plots of selected signals of the switching converter according to FIG. 1.

FIG. 14 illustrates time plots of selected signals of one of the converter stages according to FIG. 12.

DETAILED DESCRIPTION OF THE DRAWINGS

In the figures, unless otherwise indicated, the same reference numbers refer to the same circuit components and signals with the same meaning.

Figure 1:
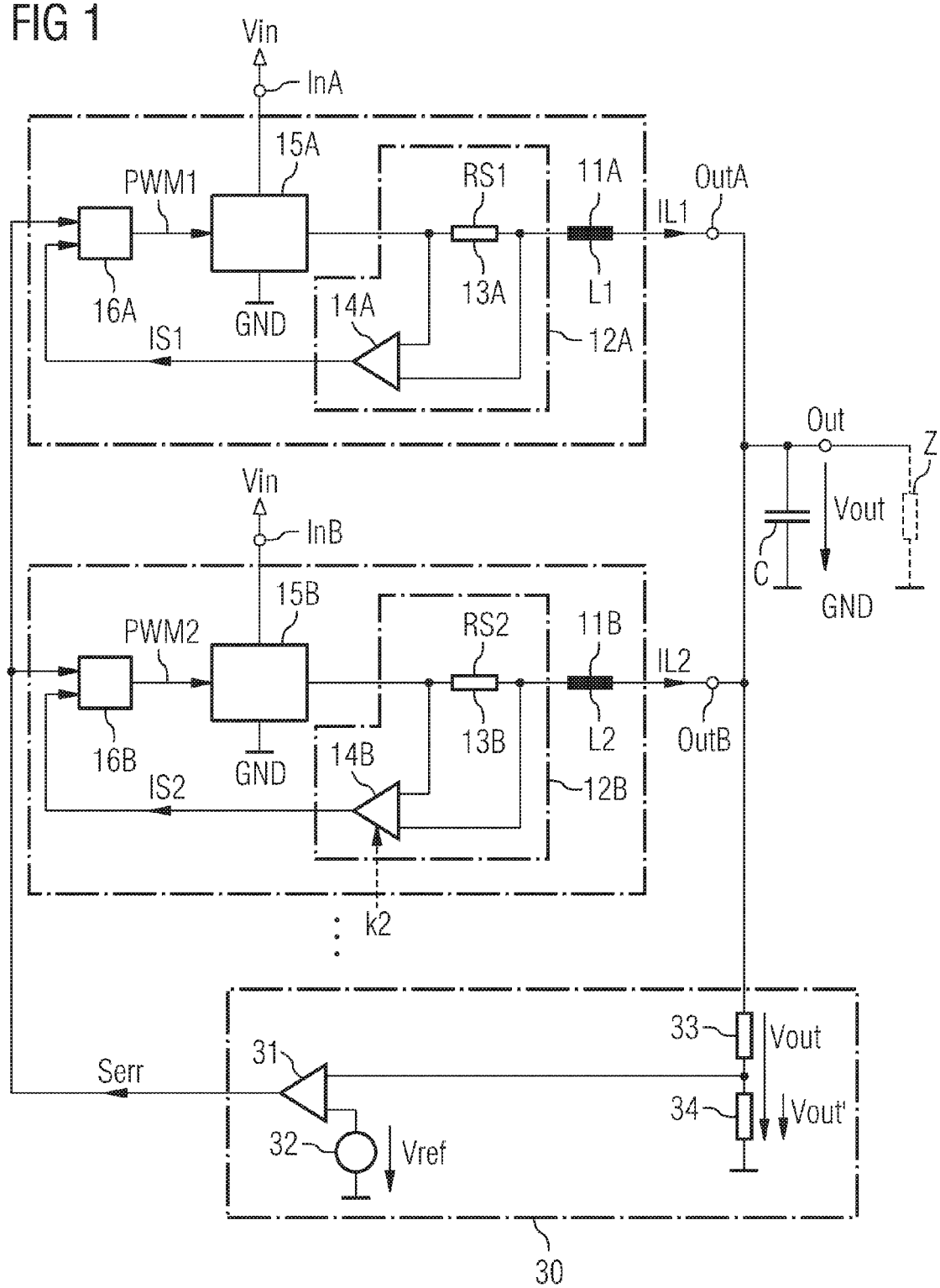
FIG. 1 shows a switching converter according to a first embodiment of the invention, having two converter stages connected in parallel, each of which has a driver stage, a pulse width modulator, and a current measurement arrangement, wherein the current measurement arrangement of one of the converter stages receives a calibration signal.

FIG. 1 shows a first embodiment of a switching converter according to the invention with several converter stages 1A, 1B connected in parallel. The switching converter shown in FIG. 1 has two converter stages connected in parallel, a first converter stage 1A and a second converter stage 1B. The first converter stage 1A is also termed hereafter the master converter stage, while the second converter stage is also termed hereafter the slave converter stage.

The converter stages 1A, 1B each have inputs INA, INB for applying an input voltage Vin and output terminals OUTA, OUTB for providing an output voltage Vout. The two converter stages are connected in parallel, since the inputs INA, INB are jointly connected to a terminal for an input potential Vin and the outputs OUTA, OUTB are jointly connected to an output terminal OUT of the switching converter. At this output OUT of the switching converter, the output voltage Vout is furnished to supply voltage to a load Z (shown by a dashed line). An output capacitor C connected to the output terminal OUT serves as a rectifying element to smooth out the output voltage Vout.

The individual converter stages in the switching converter of FIG. 1 are each designed as current mode (CM) converter stages and each of them has an inductive storage element 11A, 11B, a current measurement arrangement 12A, 12B, and a driver circuit 15A, 15B which receives the input voltage Vin. The driver circuit 15A, 15B is designed to place the particular inductive storage element 11A, 11B of a converter stage 1A, 1B at the input voltage Vin in accordance with a pulse width modulated signal PWM1, PWM2. To provide the pulse width modulated signal PWM1, PWM2, each of the converter stages 1A, 1B has a pulse width modulator 16A, 16B. Each pulse width modulator 16A, 16B of a converter stage 1A, 1B will receive a control signal or error signal Serr, being dependent on the output voltage Vout of the switching converter, as well as a current measuring signal Is1, Is2, generated in the particular converter stage 1A, 1B.

To furnish the current measuring signals Is1, Is2, the converter stages 1A, 1B each have a current measurement arrangement 12A, 12B which is designed to detect a current IL1, IL2 through the particular inductive storage element 11A, 11B and provide a current measuring signal Is1, Is2 proportional to this current IL1, IL2. Referring to FIG. 1, these current measurement arrangements 12A, 12B each comprise, for example, a current measuring resistor 13A, 13B which is connected in series with the particular inductive storage element 11A, 11B, and a measuring amplifier 14A, 14B which detects a voltage across the current measuring resistor 13A, 13*b* and provides at its output the current measuring signal Is1, Is2.

To furnish the control signal Serr, the switching converter has a control arrangement 30 which is coupled to the output terminals OUT. This control arrangement 30 compares a voltage Vout', dependent on the output voltage Vout, which in the example is generated by means of a voltage divider 33, 34 from the output voltage Vout, to a reference voltage Vref and generates the control signal Serr from the difference between this stepped-down voltage Vout' and the reference voltage Vref. The control arrangement 30 comprises a regulating amplifier 31 which receives the stepped-down voltage Vout' and the reference voltage Vref. This regulating amplifier has, for example, a proportional function (P-function), an integral function (I-function), or a proportional-integral function (PI-function).

The same components of the individual converter stages 1A, 1B are designated in FIG. 1 with the same reference numbers, to which upper-case letters have been added to distinguish the individual converter stages 1A, 1B. When the following explanations refer equally to all the converter stages of the switching converter hereafter, only the reference numbers will be used, without the upper-case letters added to distinguish them.

Figure 2:
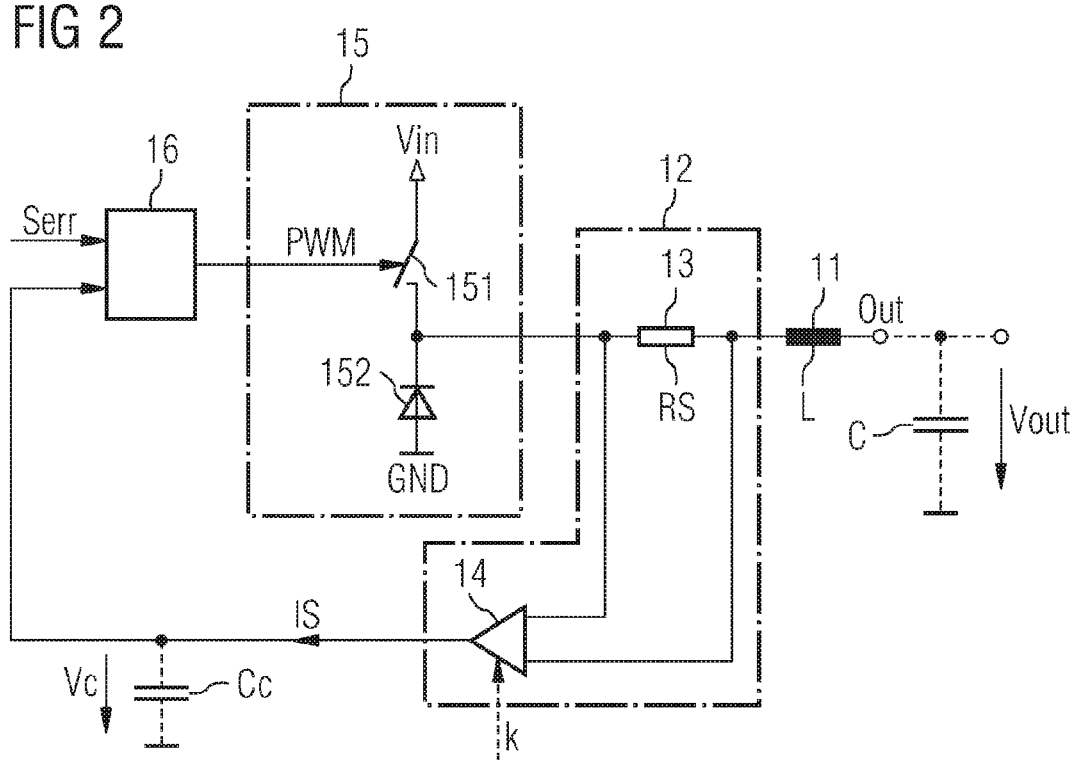
FIG. 2 illustrates an example of a driver stage of a converter stage of the switching converter according to FIG. 1.

The individual converter stages of the switching converter shown in FIG. 1 are designed as buck converters. Referring to FIG. 2, the driver stage 15 of one such buck converter has a switch 151 which is connected between the input terminal IN and the inductive storage element 11, as well as a freewheeling element 152 which is connected between the inductive storage element 11 and a terminal for a reference potential GND. This reference potential GND is ground, for example, and it usually corresponds to the potential to which the output voltage (Vout in FIG. 1) is also referred. The switch 151 is actuated by the pulse width modulated signal PWM of the pulse width modulator 16 and serves to apply the inductive storage element 11 to the input voltage Vin in dependence on the pulse width modulated signal PWM.

Figure 3:
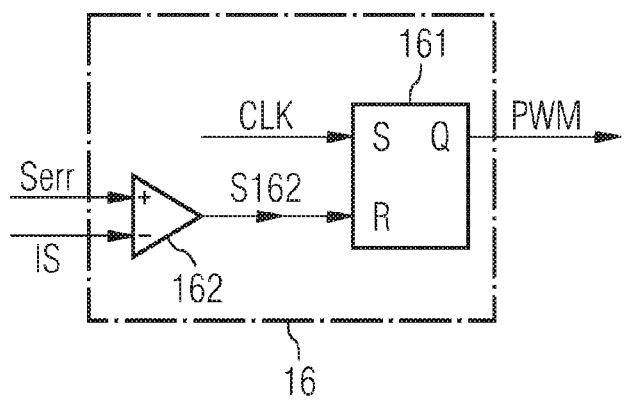
FIG. 3 illustrates an example of a pulse width modulator of a converter stage.

The pulse width modulator 16 is designed to close the switch 151 in cadence with a clock signal CLK which is generated by an oscillator not shown in further detail, and to open it depending on a comparison between the control signal Serr and the current measuring signal Is. FIG. 3 shows one possible embodiment of such a pulse width modulator 16. The depicted pulse width modulator 16 has an RS flip flop 161. The setting input S of this flip flop 161 receives the clock signal CLK, which sets the flip flop in cadence with this clock signal CLK. The reset input R of this flip flop 161 receives an output signal S162 of a comparator 162, where a plus input of this comparator 162 receives the control signal Serr and the minus input receives the current measuring signal Is. In the pulse width modulator 16 shown in FIG. 3, the flip flop 161 is then reset each time via the comparator signal S162 when the current measuring signal Is reaches or exceeds the control signal Is. The pulse width modulated signal PWM is produced at the noninverting output Q of the flip flop 161.

The mode of operation of a converter stage 15, as depicted in FIG. 2, and in particular the generation of the pulse width modulated signal PWM within the converter stage 15, will be explained hereafter with reference to FIGS. 4A to 4C. These figures show, as an example, time plots of the clock signal CLK (FIG. 4A), of the current measuring signal Is, of the feedback control signal Serr (FIG. 4B), and of the pulse width modulated signal PWM (FIG. 4C). The time plot of the current measuring signal Is corresponds to the steady state of the converter stage, i.e., when the current delivery of the converter stage to the load meets the current demand of the load.

The pulse width modulator 16 generates the pulse width modulated signal PWM in such a way that this signal each time takes on a high level with a clock pulse of the clock signal CLK. The switch 151 of the driver circuit 15 is closed at this time, so that a voltage is present across the inductive storage element 11, corresponding to the difference between the input voltage Vin and the output voltage Vout. The current IL through the inductive storage element 11 thus rises in linear fashion, until the current measuring signal Is derived from the current IL reaches the value of the feedback control signal Serr. At this time, the pulse width modulated signal PWM takes on a low level, which opens the switch 151. From this time forward, the freewheeling element 152 allows the current to flow again across the inductive storage element 11, whereupon this current IL and thus the current measuring signal Is decreases in linear fashion, until the switch is again closed with the next clock pulse of the clock signal CLK.

T in FIG. 4C designates the period of the clock signal CLK and, thus, the period of the pulse width modulated signal PWM. Ton designates the On time, Toff the Off time. The duty cycle D of the pulse width modulated signal PWM is found from the ratio between On time Ton and period T, so that: D=Ton/T.

For the above-mentioned converter stage, it can be shown that the mean current uptake $IL_m$ of the converter stage in the steady state is:

$$IL_m = Ib + \frac{1}{2}\frac{(Vin - Vout)}{L} \cdot Ton. \quad (1)$$

L designates the inductance of the inductive storage element 11 of the converter stage. The second term describes a sawtooth waveform which the inductor current follows. The first term Ib denotes an offset of the sawtooth waveform as compared to zero.

The on time Ton, referring to FIG. 4B, is dependent on the slope of the current measuring signal Is and the control signal Serr. We have:

$$g \cdot \left(Ib + \frac{1}{2} \cdot \frac{Vin - Vout}{L} \cdot Ton\right) = Serr. \quad (2)$$

g denotes the proportionality factor between the current IL across the inductive storage element and the current measuring signal Is with:

$$Is = g \cdot IL \quad (3).$$

The Term g·(Vin−Vout)/L denotes the slope of the current measuring signal Is.

It follows from equations (1) and (2) that:

$$IL_m = \frac{Serr}{g}. \quad (4)$$

The mean current uptake $IL_m$ of a converter stage is thus solely dependent on the feedback control signal Serr and the proportionality factor between the current IL across the inductive storage element and the current measuring signal Is of each converter stage.

Manufacturing-related fluctuations in the parameters of the individual components of the current measurement arrangements in the individual converter stages, unless further steps are taken against them, can result in considerable differences in the current loading of the individual converter stages, which will now be explained with reference to the switching converter in FIG. 1. Referring to equation (4), the current uptake of the first and second converter stage 1A, 1B is:

$$IL1_m = \frac{Serr}{g1} \quad (4a)$$

$$IL2_m = \frac{Serr}{g2}. \quad (4b)$$

$IL1_m$ and $IL2_m$ denote the mean current uptakes of the two converter stages. g1 and g2 denote respectively the proportionality factors between the currents IL1, IL2 and the current measuring signals Is1, Is2.

Let it now be assumed that the two proportionality factors g1, g2 are different, for example due to manufacturing-related fluctuations in the resistance values of the current measuring resistors 13A, 13B, and that:

$$g2 = (1+\epsilon) \cdot g1 \quad (5).$$

Then, for the mean current uptake of the second converter stage 1B we have:

$$IL2_m = \frac{Serr}{(1+\varepsilon) \cdot g1} = \frac{1}{1+\varepsilon} IL1_m. \quad (6)$$

The mean current uptake of the second converter stage 1B, due to the larger proportionality factor g2 as compared to the proportionality factor g1 of the first converter stage 1A, is smaller by a factor (1+E) than the mean current uptake $IL1_m$ of the first converter stage 1A.

The decrease in current uptake of a converter stage with rising proportionality factor g can be explained, referring to FIG. 4b, by the fact that the steepness of the current measuring signal Is increases with increasing proportionality factor, so that the current measuring signal Is reaches the level of the feedback control signal Serr earlier. This is tantamount to a shortening of the On time Ton.

To adjust the current uptakes of individual converter stages connected in parallel, the switching converter of the invention specifies that the current measurement arrangement 12B of the second converter stage 1B receives a calibration signal k2 to set the proportionality factor g2 between the current IL2 through the inductive storage element 11B and the current measuring signal Is2. This calibration signal k2 is chosen such that the proportionality factor g2 of the second converter stage 1B corresponds to the proportionality factor g1 of the first converter stage 1A so that, referring to equations (4a) and (4b), the mean current uptakes of the two converter stages are the same. The calibration signal k2 in the switching converter of FIG. 1 is taken to the measuring amplifier 14B of the current measurement arrangement 12B of the second converter stage 1B and serves to set the gain of the measuring amplifier 14B. This measuring amplifier is designed, for example, as a transconductance amplifier, which transforms the voltage present across the measuring resistor 13B into the measuring current Is2 present at its output. In this case, for the proportionality factor g2 we have:

$$g2 = k2 \cdot Rs2. \tag{7a}$$

Rs2 denotes here the resistance value of the current measuring resistor 13B. The same holds accordingly for the proportionality factor g1 of the first converter stage 1A:

$$g1 = k1 \cdot Rs1 \tag{7b}$$

Rs1 denotes here, accordingly, the resistance value of the current measuring resistor 13A of the first converter stage 1A. k1 denotes the gain of the measuring amplifier 14A of the current measurement arrangement 12A of the first converter stage 1A. This gain can be set at the factory or the user of the switching converter can set it by using an input, not further described. The gains of the measuring amplifiers 14A, 14B can be set rather precisely, so that fluctuations in the proportionality factors between the currents across the inductances IL1, IL2 and the current measuring signals Is1, Is2 are principally due to manufacturing-related fluctuations in the resistance values of the current measuring resistors 13A, 13B. For the calibration signal k2, assuming equal proportionality factors, i.e., g1=g2, we have:

$$k2 = \frac{k1 \cdot Rs1}{Rs2} = \frac{g1}{Rs2}. \tag{8}$$

To generate the calibration signal k2, besides the information on the gain k1 of the measuring amplifier 14A one needs information as to the ratio Rs1/Rs2 of the current measuring resistors 13A, 13B. One possible way of determining the ratio between these current measuring resistance values Rs1, Rs2 is explained hereafter with reference to FIGS. 5 and 6.

For generating the calibration signal k2 a calibration step is performed at system startup, i.e. when the output voltage Vout=0, and when the inductor currents IL1=IL2=0. The calibration steps includes applying the input voltage Vin for a predetermined On time Tc_on to the inductive storage element (11 in FIGS. 2, 11A, 11B in FIG. 1) at, then waiting until the current across the inductive storage element has dropped to zero, and then determining the change in the output voltage across the output capacitor C of the switching converter that results from this process.

Figure 5:
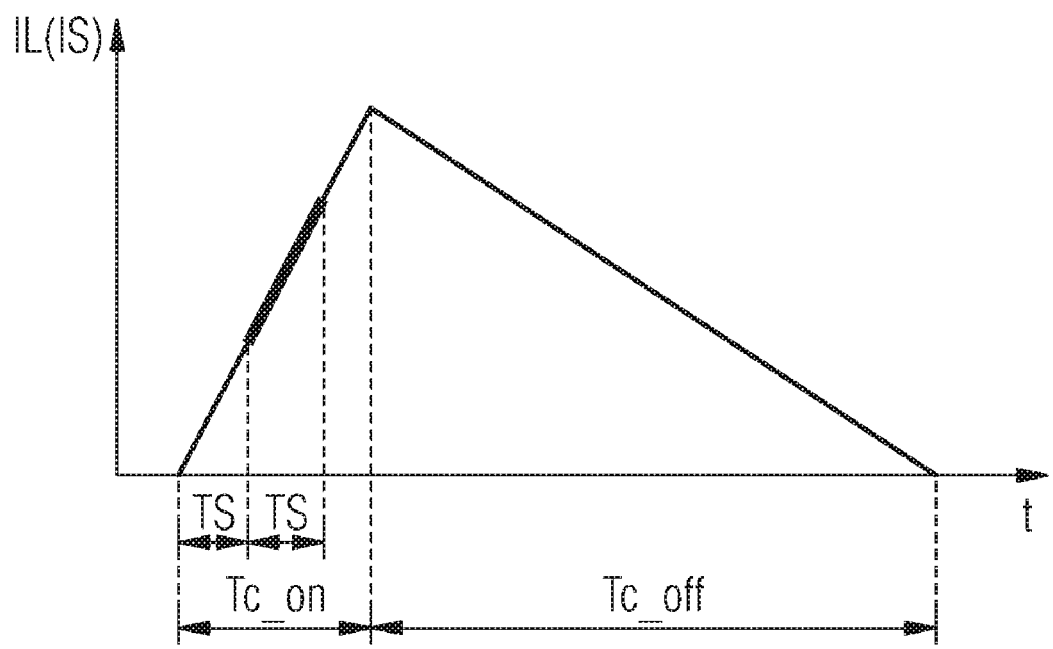
FIG. 5 illustrates a method for generating the calibration signal.
Figure 6:
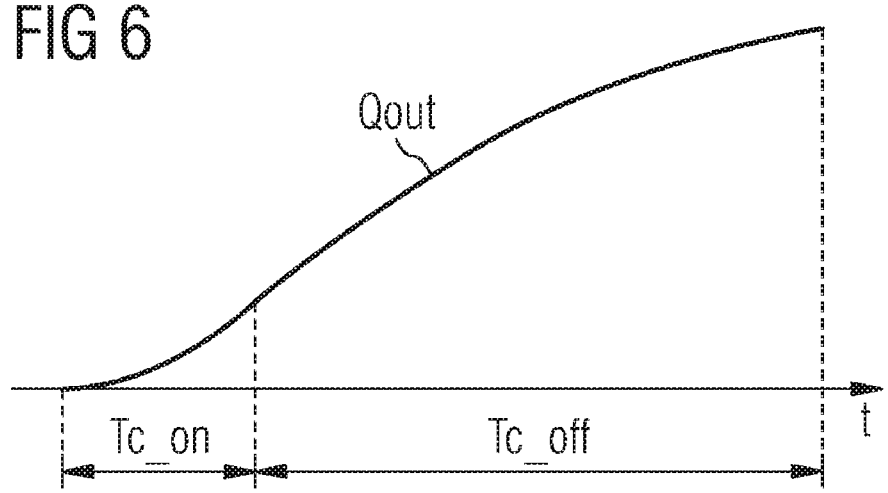
FIG. 6 illustrates a method for generating the calibration signal.

FIG. 5 shows the time plot of the current IL across the inductive storage element of a converter stage during the aforementioned process, while FIG. 6 shows the increase in the electric charge stored at the output capacitor during this process. During the On time Tc_on, the current IL across the inductive storage element increases in linear fashion and then decreases again to zero during a period Tc_off. The electric charge built up during this process in the output capacitor C will correspond to the area under the curve of the time plot of the inductance current IL. The above-mentioned process steps will be carried out in succession for all the converter stages connected in parallel. Each converter stage will increase the charge stored on the output capacitor C and increase the output voltage Vout during the calibration process.

Under the assumption that the output voltage Vout during the calibration process is always very much smaller than the input voltage Vin, we get for the current IL across the inductance during the On time Tc_on:

$$IL = \frac{1}{2} \cdot \frac{Vin}{L} \cdot t. \tag{9}$$

For the charge flowing from a converter stage onto the output capacitor C during the calibration process, we get:

$$\Delta Qout = \frac{1}{2} \cdot \frac{Vin}{L} \cdot Tc\_on \cdot (Tc\_on + Tc\_off). \tag{10}$$

Accordingly, for the change in the output voltage ΔVout brought about by a converter stage, we get:

$$\Delta Vout = \frac{\Delta Qout}{C}. \tag{11}$$

The time Tc_off, during which the inductance current IL drops to zero during the calibration process, is predominantly determined, referring to FIG. 2, by the voltage drop across the freewheeling diode 152 after the opening of the switch 151. Assuming that the output voltage Vout is substantially smaller than the voltage drop across this diode 152 during the freewheeling process, we have for the Off time Tc_off:

$$Tc\_off = \frac{Vin}{Vd} \cdot Tc\_on. \tag{12}$$

Vd denotes the voltage across the forward-switched freewheeling diode 152 after the opening of the switch 151. Taking into consideration equations (10) to (12), we get, for a change in the output voltage ΔVout caused by one of the converter stages during the calibration process:

$$\Delta Vout = \frac{1}{2} \cdot \frac{Vin}{L} \cdot \frac{Tc\_on^2}{C} \cdot \frac{Vin + Vd}{Vd}. \tag{13}$$

From this change ΔVout in the output voltage, one can deduce information as to the inductance value L of the particular inductive storage element of a converter stage.

In addition to determining the change ΔVout in the output voltage, during the calibration process, a capacitor Cc, which is present in addition to the output capacitor C for calibration purposes, will be charged with the measuring current furnished by the current measurement arrangement (12A, 12B in FIGS. 1, 12 in FIG. 2) of a particular converter stage during a fixed time period Ts, and the voltage drop Vc produced in this way across this capacitor Cc will be determined. This capacitor Cc, present for calibration purposes, is indicated for greater understanding in FIG. 2. The time plot of the measuring current Is corresponds qualitatively to the time plot of the current IL across the inductance, shown in FIG. 5, while the measuring current Is as already explained is proportional to the inductance current IL. The period Ts during which the calibration capacitor Cc is charged by the measuring current Is lies within the On time Tc_on and is likewise indicated in FIG. 5. This period Ts preferably lies not at the beginning of the On time Tc_on, but instead it starts only some time after turn-on. This waiting time can correspond, for example, to the period Is during which the calibration capacitor Cc is charged. For the measuring current Is during this rising signal edge, under the assumption that the output voltage Vout of the output capacitor C is much smaller than the input voltage Vin, we have:

$$Is(t) = g \cdot IL = g \cdot \frac{Vin}{L} \cdot t. \tag{14}$$

For the voltage Vc across the calibration capacitor Cc at the end of the charging period Is we have:

$$Vc = \frac{1}{Cc}\int_{Ts}^{2Ts} Is(t) = g \cdot \frac{1}{Cc} \cdot \frac{2}{3}\frac{Vin}{L} \cdot Ts^2. \tag{15}$$

ΔVout1 denotes hereafter the change in the output voltage that is caused by the measurement process of the first converter stage 1A, while ΔVout2 denotes the change in the output voltage caused by the measurement process of the second converter stage 1B. If the ratio between these two voltage changes is formed, and using equation (13), we get:

$$\frac{\Delta Vout1}{\Delta Vout2} = \frac{L2}{L1} \cdot \frac{1}{\lambda_2}. \tag{16}$$

$\lambda_2$ denotes here the quotient of the inductance L1 of the inductive storage element 13A of the first converter stage 1A and the inductance L2 of the inductive storage element 13B of the second converter stage 1B.

Vc1 denotes hereafter the voltage across the calibration capacitor Cc at the end of the measurement process of the first converter stage 1A, while Vc2 denotes the voltage across the calibration capacitor Cc after the close of the measurement process of the second converter stage 1B. Preferably, a single calibration capacitor Cc will be used for all the converter stages, and will be discharged each time between the individual measurement processes. If the ratio between the two voltages Vc1, Vc2 across the calibration capacitor is formed, and referring to equation (15), we get:

$$\frac{Vc1}{Vc2} = \frac{g1}{L1} \cdot \frac{L2}{g2_0}. \tag{17}$$

It follows from equations (16) and (17) that:

$$\frac{\Delta Vout2}{\Delta Vout1} \cdot \frac{Vc1}{Vc2} = \frac{g1}{g2_0} = \frac{k1 \cdot Rs1}{k2 \cdot Rs2} = \frac{1}{\rho 2}. \tag{18}$$

Thus, from the measured quantities ΔVout1, ΔVout2, Vc1, Vc2 determined during the measurement processes one can form the relation between the proportionality factor $g2_0$ of the second converter stage 1B and the proportionality factor of the first converter stage or the master converter stage 1A. $g2_0$ denotes here the proportionality factor of the second converter stage 1B before calibration of this second converter stage by means of the calibration signal k2. $k2_0$ denotes the gain of the measuring amplifier 14B of the second converter stage 1B. To achieve identical proportionality factors in the two converter stages 1A, 1B, one should set the proportionality factor of the second converter stage g2 as follows:

$$g2 = \frac{1}{g2} \cdot g2_0. \tag{19a}$$

This is tantamount to adjusting the gain k2 of the measuring amplifier 14B of the second converter stage 1B as follows, depending on the value $1/\rho 2$ derived from the measured values and the gain $k2_0$ set at the outset:

$$k2 = \frac{1}{\rho 2} \cdot k2_0. \tag{19b}$$

In a switching converter with more than two converter stages connected in parallel, for each additional converter stage i one will determine the output voltage change ΔVouti, as well as the voltage Vci present at the end of the measurement process across the calibration capacitor Cc. From these measured quantities, according to equation (18), determines the value ρi is determined. This value ρi indicates the relation between the proportionality factor g1 of the master converter stage and the initial proportionality factor $gi_0$ of the i-th converter stage and indicates the factor by which this initial proportionality factor $gi_0$ must change, via the calibration signal ki, in order to fulfill the desired condition that this i-th converter stage has the same proportionality factor as the first converter stage.

Figure 7:
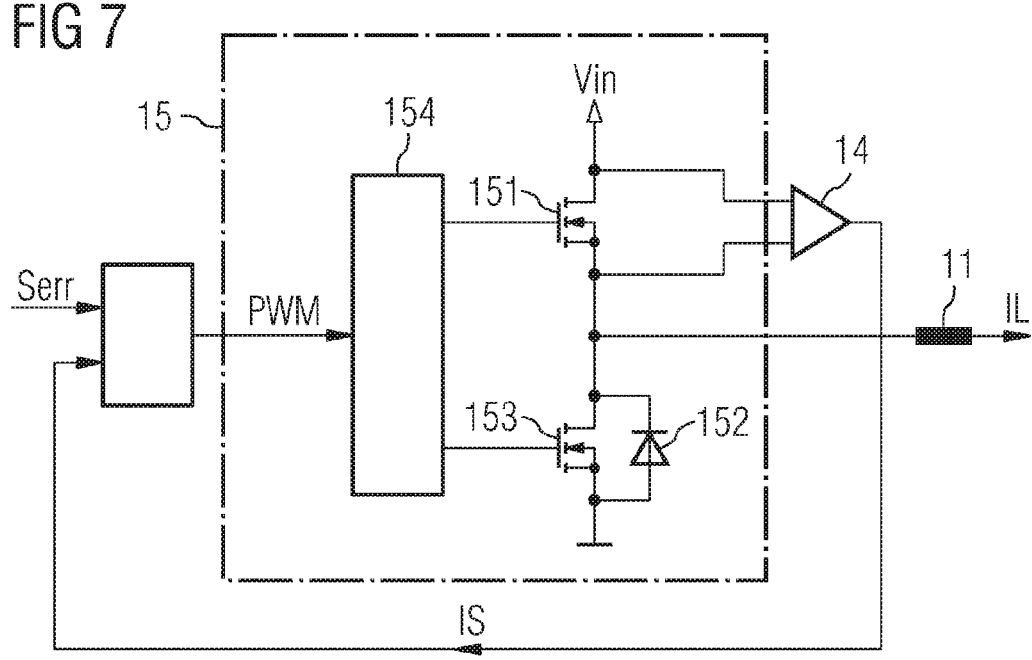
FIG. 7 shows another example of a driver stage.

In the converter stages explained with reference to FIGS. 1 and 2, the current measuring resistor 13A, 13B and 13 is a separate component connected in series with the inductive storage element 11A, 11B and 11. FIG. 7 shows an exemplary embodiment of a driver circuit 15, in which one can dispense with an additional component playing the role of a measuring resistor. This driver circuit 15 has a half-bridge circuit with two semiconductor switches 151, 153, configured in the example as n-channel MOSFETs. Load sections (drain-source sections) of these transistors are connected in series to each other between the terminal for the input voltage Vin and the terminal for the reference potential GND. A circuit node common to both the load sections of these transistors 151, 153 forms an output of the half-bridge circuit, to which the inductive storage element 11 is connected. The two semiconductor switches 151, 153 are actuated by an actuation circuit 154 in dependence on the pulse width modulated signal PWM. This actuation circuit 154 serves, in familiar fashion, to convert the pulse width modulated signal PWM to a suitable level for actuating the transistors 151, 153. The actuation circuit 154, furthermore, ensures that the two transistors 151, 153 are not biased into conduction at the same time. The first semiconductor switch 151 will be biased into conduction during the On time of the pulse width modulated signal PWM, while the second semiconductor switch 153 takes on the role of a freewheeling element for the inductive storage element 11 and is biased into conduction during the Off times of the pulse width modulated signal PWM.

The two semiconductor switches 151, 152 unavoidably have a turn-on resistance in the On state. A turn-on resistance Rds_on of the first semiconductor switch 151 plays the role in this circuit of the current measuring resistor, so that the measuring amplifier 14 is connected such that it directly picks off the voltage across the load section of the first semiconductor switch 151. The above remarks apply accordingly to the driver circuit 15 shown in FIG. 7, with the proviso that the turn-on resistance of the semiconductor switch 151 is to be used as the resistance value of the measuring resistor. The time plot of the current measuring signal Is of the converter stage shown in FIG. 7 differs from the time plot shown in FIG. 4b in that the current measuring signal Is goes directly to zero at the end of the On time Ton, if the semiconductor switch 151 is opened. Thus, the current measuring signal Is has a ramp-like appearance, as is shown by the dash-dot line in FIG. 4b.

Figure 8:
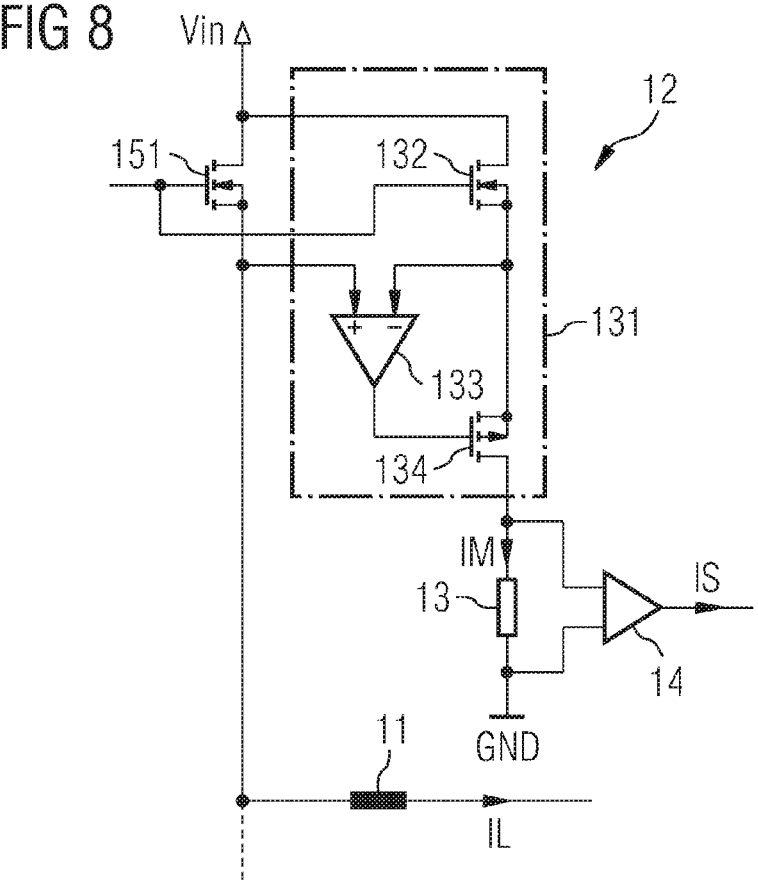
FIG. 8 shows an example of the current measurement arrangement.

Another exemplary embodiment of the current measurement arrangement 12 is shown in FIG. 8. This current measurement arrangement works by the so-called current-sense principle and has a current mirror connected to the first semiconductor switch 151. This current mirror is designed to mirror the inductance current IL flowing through the first semiconductor switch 151 when it is turned on, onto a measuring current IM. Connected in series with this current mirror arrangement 131 is a measuring resistor 13, through which the measuring current IM flows. A measuring amplifier 14 picks off the voltage across this measuring resistor 13 and from this generates the current measuring signal Is. The advantage of the current measurement arrangement shown in FIG. 8 over that shown in FIG. 7 is that the input voltage of the measuring amplifier 14 for the circuit shown in FIG. 8 is always referred to the same potential, namely, the potential to which the terminal of the current measuring resistor 13 away from the current mirror 131 is connected. This potential, for example, is the reference potential GND.

The current mirror 131 has a current mirror transistor 132 which, corresponding to the first semiconductor switch 151, is configured as an n-channel MOSFET and its gate terminal is connected to the gate terminal of the semiconductor switch 151. A load terminal of this current mirror transistor 132 is connected to one of the load terminals of the semiconductor switch 151, while the other load terminal of the current mirror transistor 132 is connected to the measuring resistor 13. Between the current mirror transistor 132 and the current measuring resistor 13 is connected a regulating transistor 134 which is actuated by a differential amplifier 133 such that the source potential of the load transistor 151 corresponds to the source potential of the current mirror transistor 132. For this, the differential amplifier 133 picks off the source potentials of these two transistors 151, 132. In the adjusted state, the measuring current IM is proportional to the load current IL, and the proportionality factor between these two currents results from the ratio between the active transistor areas of the load transistor 151 and the current mirror transistor 132. For the current measuring signal Is here, as a departure from equation (3), we have:

$$Is = IM \cdot Rs \cdot k = \frac{1}{n} \cdot IL \cdot Rs \cdot k. \tag{20}$$

Rs denotes here the resistance value of the measuring resistor 13, k denotes the gain of the measuring amplifier 14 and n, with n>1, denotes the ratio between the active transistor area of the load transistor 151 and the active transistor area of the current mirror transistor 131.

Figure 9:
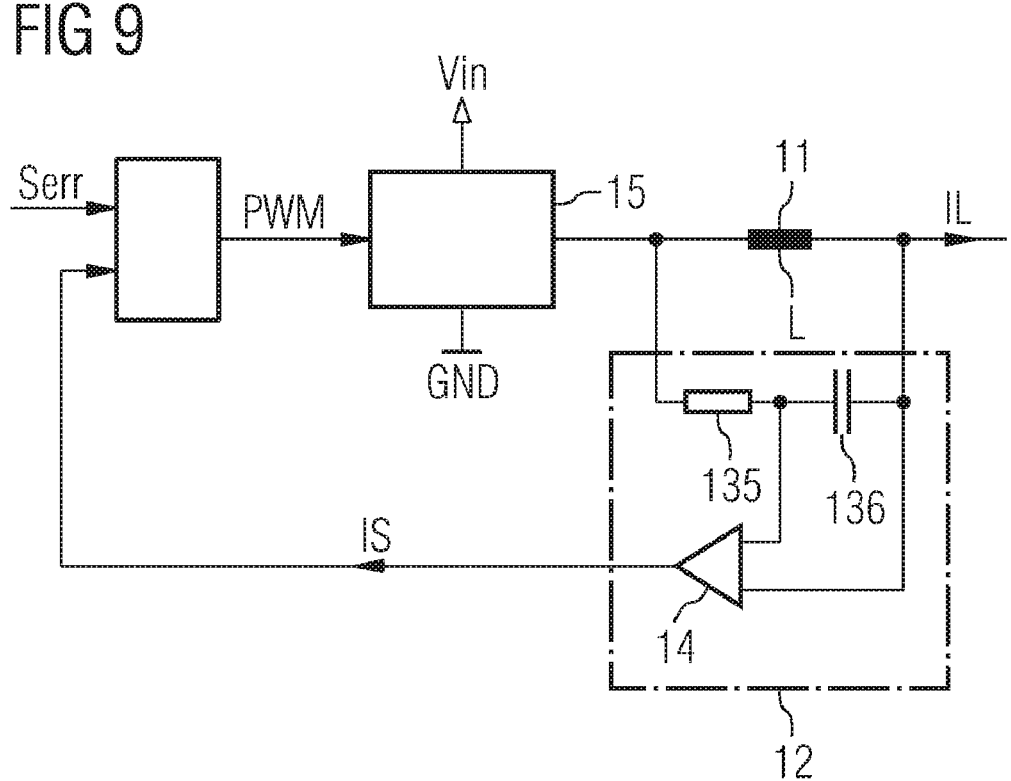
FIG. 9 shows another example of the current measurement arrangement.

FIG. 9 shows a converter stage with a current measurement arrangement 12 which derives the current measuring signal Is from the voltage across a capacitor 136. The capacitor 136 is connected in series to a resistor 135 to form an RC element, wherein the RC element is connected in parallel to the inductor. The parameters of the RC element are chosen such that the time constant of the RC element is at least approximately equal to the time constant of the inductor L. Under this condition the waveform of the voltage across the capacitor 136 matches the waveform of the inductor current, i.e. the voltage across the capacitor 136 represents both, the offset and the sawtooth component of the inductor current (see equation 1).

The calibration of the individual converter stages for the purpose of adjusting the proportionality factors between the particular current measuring signals and the currents across the respective inductances to each other can be done at the factory. In this case, the previously explained method for determining the correction factor ρi can be carried out once at the factory for all the converter stages and the calibration signals for the individual converter stages will be stored in a ROM, so as to be available during the operation of the switching converter.

Figure 10:
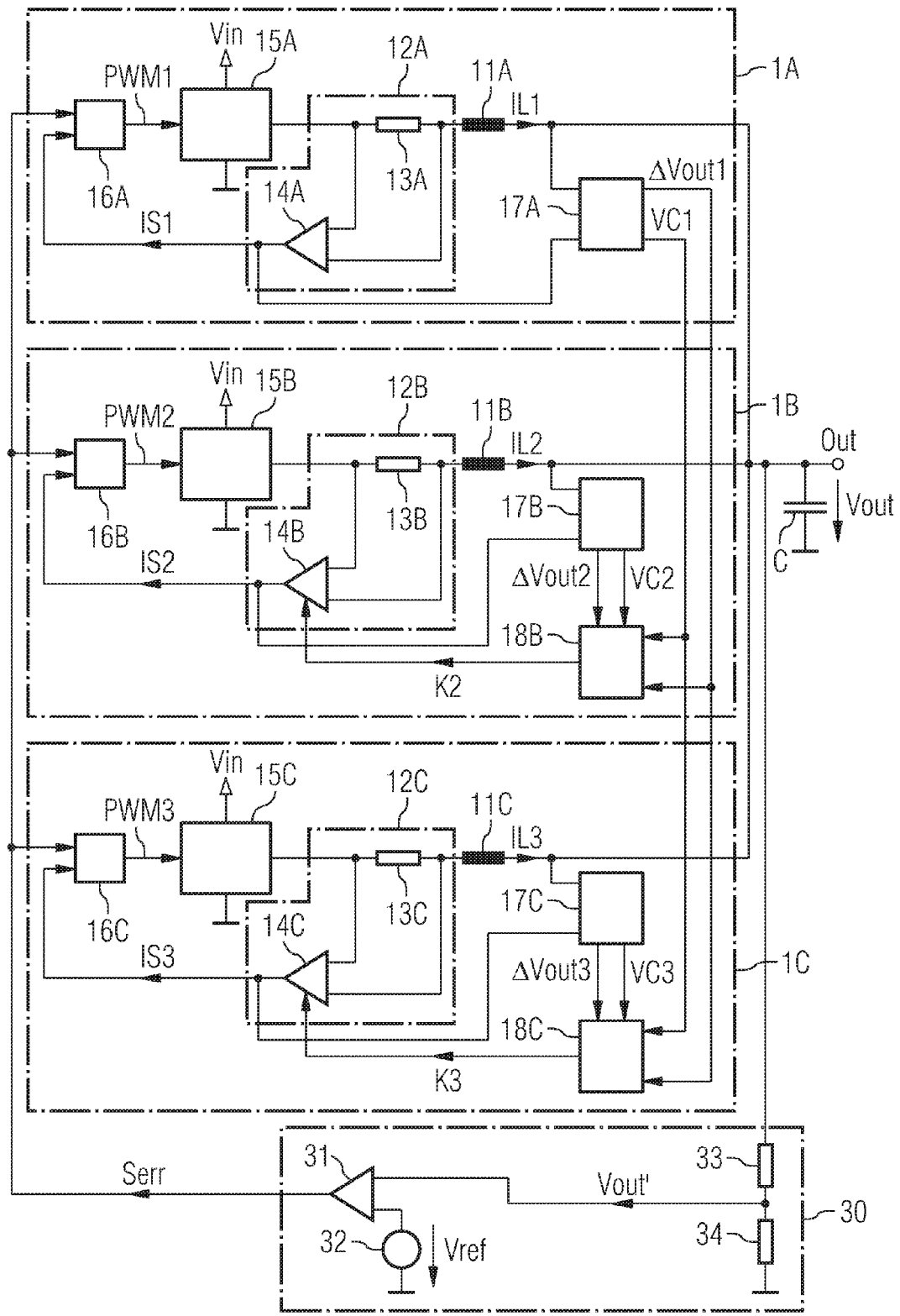
FIG. 10 shows a switching converter according to a first embodiment, having several converter stages connected in parallel and calibration units for generating calibration signals for the current measurement arrangements of individual converter stages.

FIG. 10 shows a switching converter with several (three in the example) converter stages 1A, 1B, 1C connected in parallel, which are built according to the converter stages of FIG. 1. Of the three converter stages shown in FIG. 10, the first converter stage 1A forms the master converter stage, while the other two converter stages 1B, 1C form the slave converter stages. The individual converter stages 1A, 1B, 1C each have measurement arrangements 17A, 17B, 17C, each of which are connected to the output OUT of the switching converter and to the output of the current measurement arrangement 12A present in the particular switching converter. These measurement arrangements 17A, 17B, 17C are designed so as to determine the changes in output voltage ΔVout1, ΔVout2, ΔVout3 and the voltages Vc1, Vc2, Vc3 across the measuring capacitor (not shown in FIG. 10) during the calibration process. Each of the slave converter stages 1B, 1C comprises, besides the measuring unit 17B, 17C, also a computing unit 18B, 18C which receives the measurement values of the measurement arrangement of this slave converter stage and the measurement values ΔVout1 and Vc1 of the master converter stage. This calculation unit 18B, 18C is designed to determine the calibration signals k2, k3 from these measurement values in accordance with equations (7) and (8).

These calibration signals k2, k3 can be generated, for example, each time the switching converter is turned on.

Figure 11:
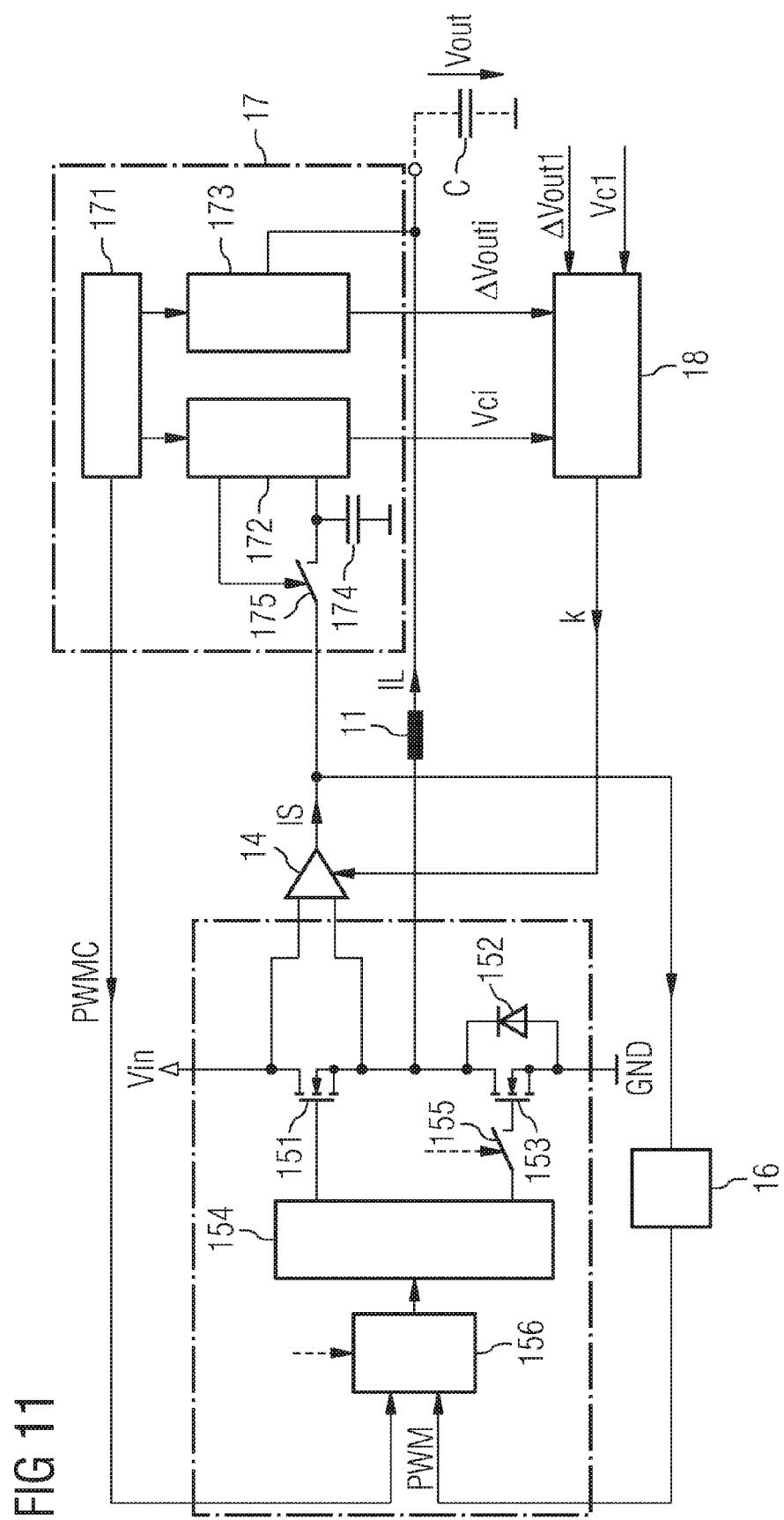
FIG. 11 shows a converter stage with a calibration unit in detail.

With reference to FIG. 11, the basic mode of operation of the measurement arrangements 17A-17C and that of the computing units 18B, 18C, will now be explained. FIG. 11 shows one of the slave converter stages in detail. The measuring unit 17 here comprises a control circuit 171 and two evaluating circuits 172, 173, one of which is coupled to the output terminal OUT of the switching converter and the other is connected to a calibration capacitor 174. In this regard, it should be noted that this calibration capacitor 174, which corresponds to the capacitor Cc in FIG. 2, can be a calibration capacitor in common for all the converter stages, being connected to one of the measurement arrangements 17 in a manner not described in greater detail for the particular measurement process.

The driver circuit 15 contains, in addition to the circuitry components already explained, a multiplexer 156 which is connected in series to the actuating circuit 154 and which in accordance with a selection signal sends the pulse width modulated signal PWM generated by the pulse width modulator 16 or a signal PWM_c generated by the control circuit 171 to the actuating circuit 154. Controlled by the selection signal, which is furnished for example by a central control circuit not described in further detail, the multiplexer furnishes during the calibration process the signal PWM_c furnished by the control circuit 171 to the actuating circuit 154. The signal PWM_c prescribes the length of time Tc_on (cf. FIG. 5) during the calibration process during which the first semiconductor switch 151 is closed during the calibration process. Optionally, in the driver circuit 15, an additional switch 155 is connected in series to the control terminal of the second semiconductor switch 153, and prevents actuation of this second semiconductor switch 153 during the calibration process. A body diode 152 integrated into the second semiconductor switch 153, configured as a MOSFET, then serves as the freewheeling element for the inductive storage element during the calibration process. The first semiconductor switch 151 has a corresponding body diode, although this is not shown explicitly in FIG. 11.

The use of the body diode 152 of the second semiconductor switch 153 as a freewheeling element during the calibration process leads to a shortening of the period Tc_off (cf. FIG. 5) within which the inductance current IL again drops to zero, as compared to the use of the forward-biased second semiconductor switch 153 as a freewheeling element during the freewheeling process. Referring to equation (12), this freewheeling time Tc_off is shorter the greater the voltage drop across the freewheeling element. In order to shorten the freewheeling time Tc_off, for the above-mentioned reasons, it is advantageous not to forward-bias the second semiconductor switch 153 during the freewheeling process. The switch 155, which is connected in series to the control terminal of the second semiconductor switch 153, is likewise actuated by a central control unit governing the calibration process, in a way not indicated in further detail.

The first and second evaluating circuits 172, 173 receive control signals via the control circuit 171 of the measurement arrangement 17, which signal to the evaluating circuits 172, 173 the start of the measurement process, i.e., the time at which the pulse width modulated signal PWM_c of the control circuit 171 takes on a high level. The first evaluating circuit 172 generates from this an actuation signal S175 for a switch 175 which, after the start of the measurement process, charges the calibration capacitor 174 for the length of time Ts (cf. FIG. 5) with the measuring current Is present at the output of the measuring amplifier 14. The evaluating circuit 172 picks off the voltage via this calibration capacitor 174 and provides the measurement value Vci at an output at the end of the measurement process. The second evaluating circuit 173 detects the voltage change at the output capacitor C and provides the second measurement value ΔVouti at the end of the measurement process. These two measurement values Vci, ΔVouti are taken, along with the corresponding measurement values Vc1, ΔVout1 of the first converter stage, to the calculating unit 18. This calculating unit 18 generates, as explained, the calibration signal k for the measuring amplifier 14 of the current measurement arrangement.

The first converter stage is realized in accordance with the converter stage shown in FIG. 11, although a calculating unit is dispensed with in this first converter stage.

In the switching converter explained with reference to FIGS. 1 through 11, the individual converter stages are configured as current mode converter stages. The pulse width modulated signals in the individual converter stages are generated in this case in dependence on the feedback control signal Serr and in dependence on the current measuring signals ascertained in the individual converter stages.

Figure 12:
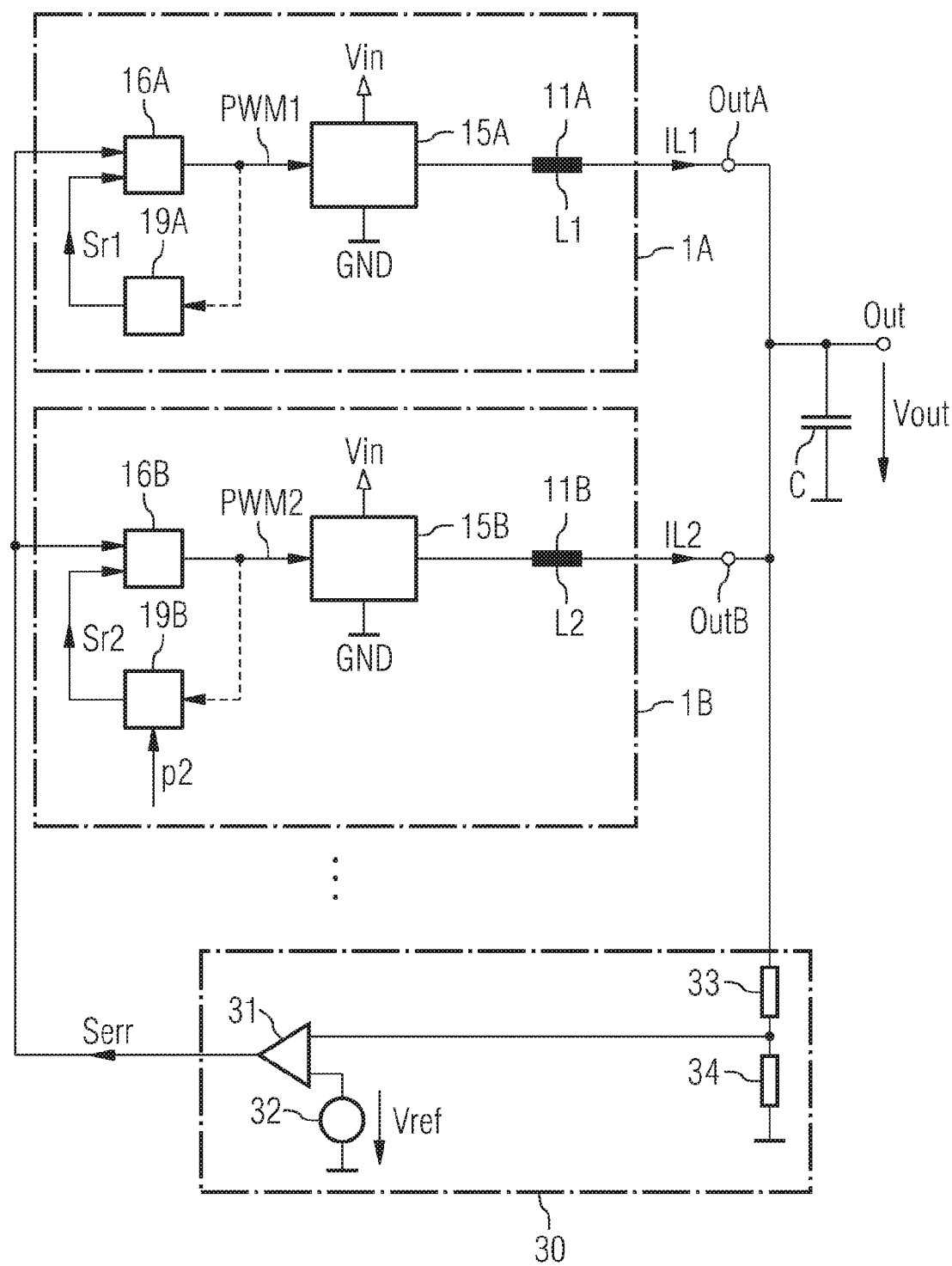
FIG. 12 shows a switching converter according to a second embodiment, having VM converter stages connected in parallel, each of which has a driver circuit, a pulse width modulator, and a ramp signal generator.

FIG. 12 shows a switching converter according to a second embodiment of the present invention. This switching converter is a so called voltage mode converters and has several (two in the example shown) converter stages 1A, 1B connected in parallel, which differ from the previously discussed converter stages in that, instead of a current measurement arrangement, they each have a ramp signal generator 19A, 19B which furnishes a ramp signal Sr1, Sr2 to the pulse width modulator 16A, 16B of the particular converter stage. The pulse width modulators 16A, 16B receive, in the manner already explained, the feedback control signal Serr from the regulating arrangement 30 coupled to the output OUT of the switching converter. The ramp signal generators 19A, 19B of the individual converter stages 1A, 1B can receive the pulse width modulated signal PWM1, PWM2 of the particular converter stage, as shown by the dotted line in FIG. 12.

Figure 13:
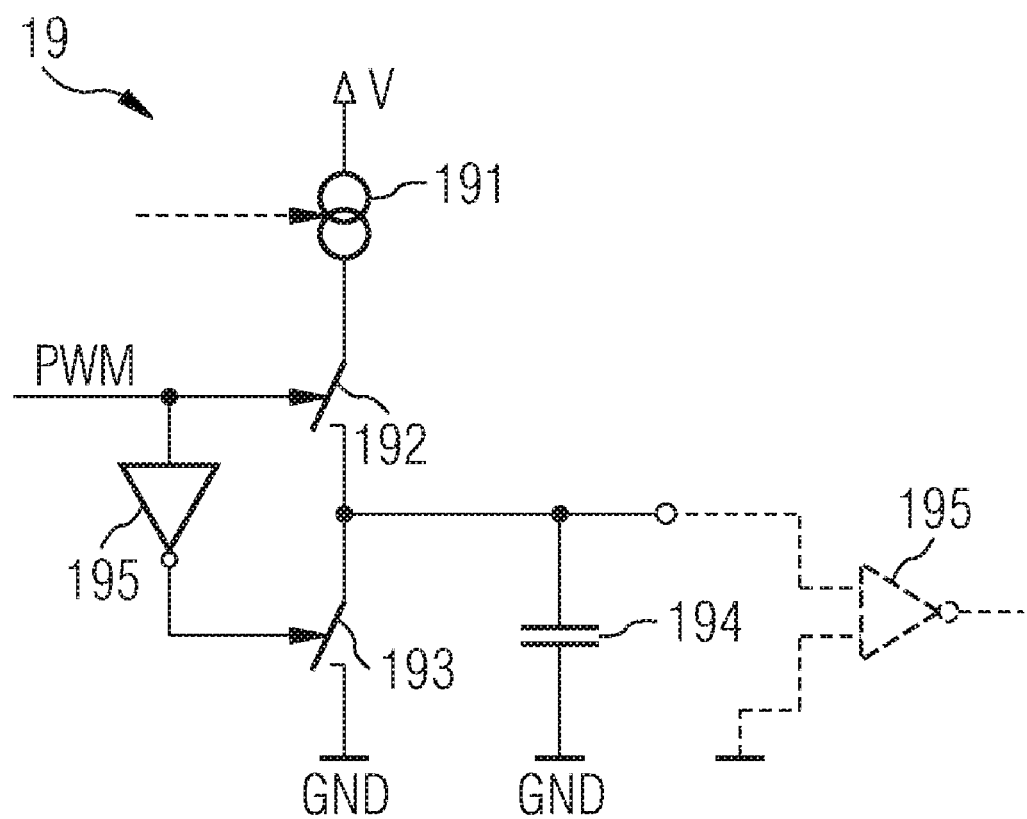
FIG. 13 shows an example of a ramp signal generator with an adjustable ramp slope.

One possible exemplary embodiment of a ramp signal generator 19 is shown in FIG. 13. This ramp signal generator has a series circuit with a current source 191, a switch 192, and a capacitor 194 which is connected between a terminal for a supply potential V and a reference potential GND. The first switch 192 is actuated by the pulse width modulated signal PWM and serves to charge the capacitor 194 with a current furnished by the current source 191 during the On time of the pulse width modulated signal. In parallel with the capacitor 194 is connected a second switch 193 which is actuated in a complementary manner to the first switch 192. This second switch 193 receives the pulse width modulated signal PWM via an inverter 195. The purpose of the second switch 193 is to discharge the capacitor 194 during the Off time of the pulse width modulated signal PWM.

The pulse width modulators 16A, 16B are realized, for example, in correspondence with the pulse width modulator of FIG. 3.

The interaction of the pulse width modulators 16A, 16B and the ramp signal generators 19A, 19B to create the pulse width modulated signals PWM1, PWM2 will now be explained with reference to FIG. 14. FIG. 14 shows, for one converter stage, time plots of the ramp signal Sr (FIG. 14A), the clock signal CLK created in the particular pulse width modulator or supplied to this pulse width modulator (FIG. 14B), the pulse width modulated signal PWM (FIG. 14C), and the time plot of the current IL through the inductive storage element (FIG. 14D). The pulse width modulated signal PWM is created in cadence with the clock signal CLK, in that an On time Ton of the pulse width modulated signal starts each time with a pulse of the clock signal CLK. With the starting of the On time Ton of the pulse width modulated signal PWM, the capacitor 194 of the ramp signal generator 19 is charged by the current of the current source 191, whereby a voltage V194 across this capacitor increases continuously. The ramp signal Sr available at an output of the ramp signal generator 19 corresponds either to the voltage across this capacitor or to a current signal derived from this voltage by means of a transconductance amplifier 196. Such a transconductance amplifier 196 is shown by a dotted line in FIG. 13.

The On time Ton of the pulse width modulated signal PWM ends when the ramp signal Sr reaches the value of the feedback control signal Serr.

Equation (1) holds for the mean current uptake $IL_m$ of one of the converter stages 1A, 1B according to FIG. 12, in dependence on the On time Ton. The On time Ton for one of these converter stages is dependent on the slope of the ramp signal and the feedback control signal Serr, so that:

$$\text{Ton} = \frac{\text{Serr}}{mr} = g \cdot IL. \quad (21)$$

mr denotes here the slope of the ramp signal Sr, which in turn is dependent on the current furnished by the current source 191 and the capacitance of the capacitor 194. Taking into account equations (1) and (21), for the mean current uptake $IL_m$ of one of the converter stages according to FIG. 12 we have:

$$IL_m = \frac{1}{2}\left(\frac{Vin - Vout}{L}\right) \cdot \frac{Serr}{mr}. \quad (22)$$

Thus, for the ratio between the mean current uptakes $IL1_m/IL2_m$ of the first and second converter stages 1A, 1B connected in parallel, we have:

$$\frac{IL1_m}{IL2_m} = \frac{L2 \cdot mr2}{L1 \cdot mr1}. \quad (23)$$

L1, L2 denote here the inductances of the inductive storage elements 11A, 11B. By mr1, mr2 are denoted the slopes of the ramp signals Sr1, Sr2 produced by the ramp signal generators 19A, 19B.

The mean current uptakes of the two parallel-connected converter stages, with reference to equation (23), can differ from each other due to manufacturing-related tolerances of the inductance values L1, L2 and due to manufacturing-related tolerances of the components used to realize the ramp signal generators 19A, 19B. In order to adapt the mean current uptakes of the two parallel-connected converter stages 1A, 1B the invention proposes sending to the ramp signal generator 19B of the second converter stage 1B a calibration signal p2, which serves to adjust the ramp steepness of the ramp signal Sr2 produced by this ramp signal generator 19B. Referring to FIG. 13, this calibration signal p2 serves, for example, to adjust the current furnished by the current source 191. A reduction of this current in dependence on the calibration signal results in a lessening of the steepness of the ramp signal produced by the ramp signal generator, while an increase in the current strength of the source 191 brings about greater ramp steepness. The calibration signal p2 is chosen such that we have, for the ramp steepness mr2 of the ramp signal Sr2:

$$mr2 = \frac{L1}{L2} \cdot mr1 = \lambda 2 \cdot mr1. \quad (24)$$

By λ2 in equation (24) is denoted the ratio between the inductances L1, L2 of the inductive storage element 11A, 11B of the converter stages 1A, 1B connected in parallel. The ratio between these two inductances, with reference to equation (16), can be determined by means of the calibration method explained in connection with this equation, wherein the inductances of the individual converter stages are placed for a predetermined length of time Tc_on at the input voltage Vin and wherein a voltage difference ΔVout of the output capacitor C of the switching converter that results from this process is determined.

The value of the slope mr1 is set a priori. This value is determined by stability considerations. In steady state the loop gain of the individual converter stages will be proportional to the input voltage and inversely proportional to the maxim value of the ramp signal, with the maximum being mr1·Ts.

Referring to the above the calibration step should be performed at the power converter startup. Only at this time the values ΔVout1, ΔVout2 and Vc1, Vc2, which are required for calculating the two parameters g2 and L2, can be measured in the way described above. However if the calibration steps as described in connection with equations (15) and (17) is performed during normal operation of the voltage converter, information about variations of the ratio g/L=Ai·Rsense/L may can be obtained. In general, Rsense/L is a ratio dependent on external parameters, and these parameters are very likely to chance 1) during lifetime and 2) during the operation after startup. Such variation may occur due to aging, temperature, stress, etc. Hence, if equation (17) is evaluated sometime during the operation of the voltage converter, the adjusting factors ki can be updated for coping with modifying conditions—a changing temperature first of all.

The invention claimed is:

1. A switching converter for generating an output voltage from an input voltage, comprising:
   a control arrangement for furnishing a control signal dependent on the output voltage,
   a first converter stage and at least a second converter stage, each converter stage including
      an inductive storage element with an inductance,
      a ramp signal generator configured to provide a ramplike signal having a ramp slope,
      a pulse width modulator which receives the control signal and the ramplike signal and which is configured to generate a pulse width modulated signal, and
      a driver circuit which receives the pulse width modulated signal and the input voltage and is configured to apply the input voltage to the inductive storage element in dependence on the pulse width modulated signal,
   wherein the ramp signal generator of the at least one second converter stage is operably coupled to receive an adjustment signal which is dependent on the inductance of the inductive storage element of the first converter stage, the ramp signal generator configured to adjust the ramp slope responsive to the adjustment signal,
   wherein the at least one second converter stage further comprises a computing unit configured to generate the adjustment signal, and
   wherein the computing unit is further configured to generate the adjustment signal based on the equation:

$$k2 = \frac{k1 \cdot Rs1}{Rs2} = \frac{g1}{Rs2}$$

wherein k1 is an amplifier gain of the first converter stage, Rs1 is a resistance of a current measuring resistor of the first converter stage, and Rs2 is a resistance of a current measuring resistor of the at least one second converter stage.

2. The switching converter according to claim 1, wherein the computing unit is further configured to determine the ratio of Rs1 to Rs2 during a calibration step.

3. The switching converter according to claim 2, further comprising a measuring unit coupled to the computing unit, the measuring unit operably coupled to provide the computing unit with a measurement of a change in output voltage generated during the calibration step, and a voltage across a calibration capacitor at the end of the calibration step.

4. A switching converter for generating an output voltage from an input voltage, comprising:
   a control arrangement for furnishing a control signal dependent on the output voltage,
   a first converter stage and at least a second converter stage, each converter stage including
   an inductive storage element with an inductance,
   a ramp signal generator configured to provide a ramplike signal having a ramp slope,
   a pulse width modulator which receives the control signal and the ramplike signal and which is configured to generate a pulse width modulated signal, and
   a driver circuit which receives the pulse width modulated signal and the input voltage and is configured to apply the input voltage to the inductive storage element in dependence on the pulse width modulated signal,
   wherein the ramp signal generator of the at least one second converter stage is operably coupled to receive an adjustment signal which is dependent on the inductance of the inductive storage element of the first converter stage, the ramp signal generator configured to adjust the ramp slope responsive to the adjustment signal,
   wherein the at least one second converter stage further comprises a computing unit configured to generate the adjustment signal, and wherein the computing unit is further configured to generate the adjustment signal based on a ratio of a resistance of a current measuring resistor of the first converter stage to a resistance of a current measuring resistor of the at least one second converter stage.

5. The switching converter according to claim 4, wherein the computing unit is further configured to determine the ratio during a calibration step.

6. The switching converter according to claim 5, further comprising a measuring unit coupled to the computing unit, the measuring unit operably coupled to provide the computing unit with a measurement of a change in output voltage generated during the calibration step, and a voltage across a calibration capacitor at the end of the calibration step.

* * * * *